US008818570B2

(12) United States Patent
Johnson et al.

(10) Patent No.: US 8,818,570 B2
(45) Date of Patent: Aug. 26, 2014

(54) ELECTRONIC CONTROL UNIT LIMITER WITH CODED RELEASE

(75) Inventors: Daniel Johnson, Thief River Falls, MN (US); Darrel Janisch, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 9 days.

(21) Appl. No.: 13/460,588

(22) Filed: Apr. 30, 2012

(65) Prior Publication Data
US 2013/0289799 A1 Oct. 31, 2013

(51) Int. Cl.
*G05D 1/00* (2006.01)
*G05D 3/00* (2006.01)
*G06F 7/00* (2006.01)
*G06F 17/00* (2006.01)
*G06F 19/00* (2011.01)
*G06G 7/70* (2006.01)
*B60T 7/12* (2006.01)

(52) U.S. Cl.
USPC .................... 701/2; 701/99; 701/103

(58) Field of Classification Search
CPC .......... G06F 17/00; F02D 41/00; B60R 25/04
USPC ...................................... 701/2, 99
See application file for complete search history.

(56) References Cited

U.S. PATENT DOCUMENTS

| 6,356,186 | B1 | | 3/2002 | Price et al. |
| 7,222,006 | B2 | * | 5/2007 | Proefke et al. ............... 701/29.6 |
| 7,346,439 | B2 | * | 3/2008 | Bodin .............................. 701/36 |
| 7,363,139 | B2 | | 4/2008 | Glora et al. |
| 7,474,943 | B2 | * | 1/2009 | Matsubara et al. ............... 701/2 |
| 7,532,962 | B1 | * | 5/2009 | Lowrey et al. ............... 701/32.3 |
| 8,131,605 | B2 | * | 3/2012 | Donnelli et al. ................. 705/28 |
| 8,548,710 | B1 | * | 10/2013 | Reisenberger .................. 701/93 |
| 2002/0170762 | A1 | * | 11/2002 | Daneshmand ................ 180/178 |
| 2006/0076742 | A1 | | 4/2006 | Scholl |
| 2008/0223646 | A1 | * | 9/2008 | White et al. ................... 180/287 |
| 2011/0132679 | A1 | | 6/2011 | Kerner et al. |
| 2012/0197465 | A1 | * | 8/2012 | Gotou et al. ...................... 701/2 |

FOREIGN PATENT DOCUMENTS

| GB | 2454273 | 5/2009 |
| WO | WO0222407 | 3/2002 |

* cited by examiner

*Primary Examiner* — Fadey Jabr
*Assistant Examiner* — Paula L Schneider
(74) *Attorney, Agent, or Firm* — Lowe Graham Jones PLLC

(57) ABSTRACT

An electronic control unit ("ECU") limiter is disclosed. The ECU can include a vehicle-mounted component configured to measure and interact with components of the vehicle such as the engine, the transmission, etc, and a remote component configured to communicate with the vehicle-mounted component and vice versa. The vehicle-mounted component can be programmed to permit the vehicle to operate substantially without limitation until a certain parameter threshold is met, such as the engine usage reaching a certain predetermined quantity. The vehicle-mounted component can limit the engine in a variety of ways when the parameter threshold is met. The remote component can receive information from the vehicle-mounted component regarding the monitored parameters and the limitations caused by the vehicle-mounted component.

29 Claims, 2 Drawing Sheets

ELECTRONIC CONTROL UNIT LIMITER WITH CODED RELEASE

FIELD OF INVENTION

This invention relates generally to an electronic control unit ("ECU") limiter with a coded release for a vehicle.

BACKGROUND OF THE INVENTION

Recreational vehicles, such as all-terrain vehicles ("ATVs"), recreational off-road vehicles ("ROVs") and other similar equipment usually represent a significant purchase. As such, buyers enjoy testing a vehicle before purchasing in an environment similar to the one in which they will use the vehicle. The buyer may wish to test the vehicle under actual conditions such as at full throttle, full speed, etc. However, the dealer, manufacturer, and consumer have an interest in selling the vehicle and having it registered for warranty purposes. Thus, once the vehicle is sold to a consumer, the testing comes to a close and the vehicle is registered and warranty coverage starts for the new owner. There is a need in the art for a system and/or method of controlling the usage of a vehicle or other equipment after purchase that ensures that the vehicle is covered by warranty from the manufacturer but that still allows the vehicle to be tested before purchase under real conditions.

SUMMARY OF THE INVENTION

The present invention is directed to systems and methods of selectively controlling a vehicle using the vehicle's electronic control unit ("ECU"). The ECU can permit the vehicle to be operated normally and substantially without restriction for a certain period of time or for a certain amount of engine use. The ECU can include a vehicle monitoring component and a limiter. The component is configured to monitor engine usage of the vehicle. The limiter is operably coupled to the vehicle monitoring component and configured to place limits on operation of the vehicle when the vehicle monitoring component detects that the engine usage of the vehicle reaches a predetermined threshold. At such threshold, the ECU is configured to receive an instruction to implement operational limits. The ECU can also be instructed to remove the operational limits if the proper authentication code is provided. The limits can be removed at any time, including before the limits are placed on the vehicle, in which case the limits will never take effect.

In other embodiments, the invention is directed to a method of controlling a vehicle, including monitoring engine time of a vehicle, permitting the vehicle to operate without limitation if the engine time is below a predetermined threshold, and when the engine time reaches the predetermined threshold, limiting operation of the vehicle.

In still other embodiments, the invention is directed to an ECU unit having a vehicle monitoring component and a limiter. The monitoring component is configured to monitor engine time of the vehicle and compare the engine time of the vehicle to a predetermined time. The limiter is coupled to an electronic fuel injection system of the vehicle, wherein the limiter is configured to limit revolutions per minute ("RPM") of the vehicle or a speed of the vehicle or both in response to the vehicle monitoring component detecting that the engine time has exceeded the predetermined time. The ECU can also include a code receiving component configured to receive a code that deactivates the limiter.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENTS

The present disclosure is directed to an ECU configured to limit operation of a vehicle under certain predefined operating conditions. The present disclosure can be used with vehicles or with other equipment such as appliances, heavy machinery, or any other suitable equipment. For purposes of explanation, however, the present disclosure will reference vehicles for conciseness and to avoid obscuring aspects of the present disclosure. The ECU can monitor a vehicle parameter, such as engine operation time, fuel consumption, speed, or distance traveled, and if the parameter exceeds a certain limit, the vehicle is permitted to operate only in a limited capacity. The ECU will continue to limit the operation of the vehicle until an unlocking code is entered. For example, a vehicle can be operated by a dealer and by potential customers for a certain time (e.g., 5 engine hours) before the ECU initiates operation limits. After reaching the prescribed parameter limit, the ECU limits operation of the vehicle to within certain prescribed parameters, such as by limiting the engine speed (RPM) or the ground speed of the vehicle, or any other suitable parameter.

Figure 1:
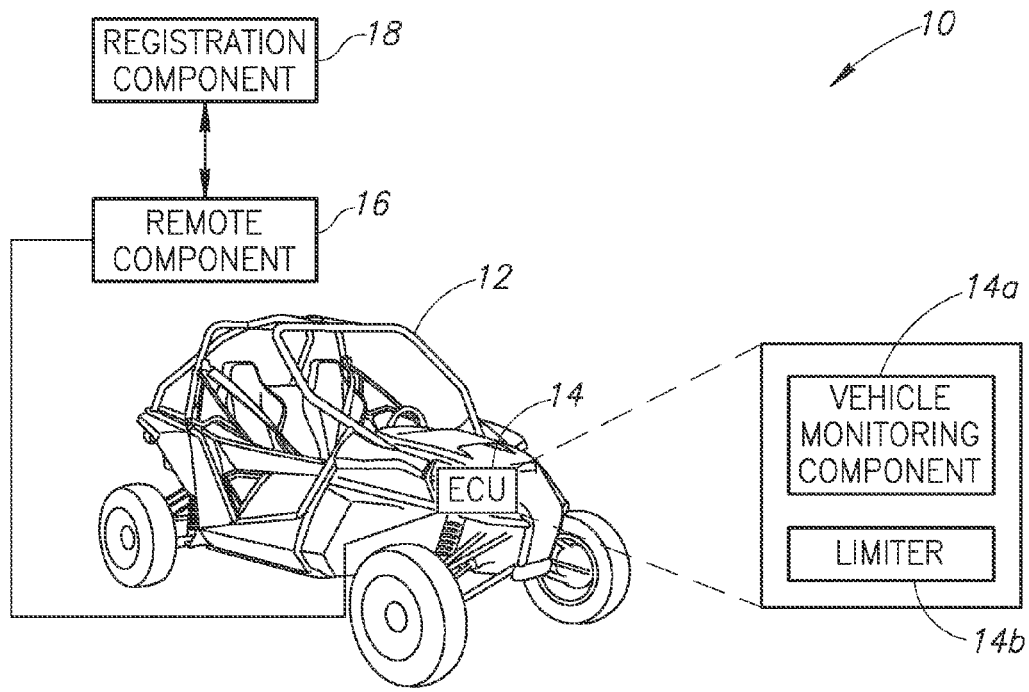
FIG. 1 is a schematic diagram illustrating an ATV having an electronic vehicle limiter system according to the present invention.

FIG. 1 is a schematic illustration of an ECU system 10 according to embodiments of the present disclosure. The system 10 can include a vehicle 12, an ECU 14, a remote component 16, and a registration component 18. The vehicle 12 can be any suitable vehicle, such as a recreational off-road vehicle ("ROV"), a snowmobile, a motorcycle, an automobile, or any other equipment. The ECU 14 can comprise a vehicle monitoring component 14a and a limiter 14b. The ECU 14 can be part of the main ECU of the vehicle or can be built directly into a gauge of the vehicle. The ECU 14, for purposes of this invention, can be anything with a processor to control or influence a vehicle parameter, such as fuel use, rpm, etc. The ECU may be coupled with the main control unit of the vehicle or may be separate. The vehicle monitoring component 14a can be operably coupled to systems of the vehicle 12, such as the fuel injection system, the exhaust system, the electronic system, the drive train, the internal instruments of the vehicle, or any other suitable vehicle system. The vehicle monitoring component 14a can monitor vehicle parameters of these vehicle systems using any suitable sensing mechanism. The vehicle monitoring component 14a can monitor a multitude of measurable vehicle parameters, such as a location of the vehicle, fuel consumption, fuel type used, exhaust parameters, power output, speed, acceleration, identity of a driver or passenger, a load on the vehicle, distance traveled, or terrain type.

The limiter 14b can be operably coupled to the vehicle monitoring component 14a to send and/or receive instructions to/from the vehicle monitoring component 14a. The limiter 14b can also be coupled to vehicle systems in a manner that permits the limiter 14*b* to influence the vehicle systems. For example, the limiter 14*b* can be coupled to an electronic fuel injection system of the vehicle 10 to limit fuel injection parameters to limit the vehicle 10 as needed. The limiter 14*b* can be coupled to any suitable vehicle system, such as the fuel system, the exhaust system, engine parameters (e.g., speed, position, or rpm of various components), or any other suitable vehicle system. The limiter 14*b* can limit operation of the vehicle 10 to within a prescribed limit according to the vehicle monitoring component 14*a*. For example, the limiter 14*b* can prevent the engine from starting, limit RPMs of the engine, limit the top speed of the vehicle, limit load on the engine, limit the distance the vehicle is permitted to travel, limit the power or torque output of the vehicle, limit the fuel consumed by the vehicle, or any other suitable vehicle operation limit.

The remote component 16 can communicate with the ECU 14 to direct the ECU 14 to place limits on the vehicle 12 or to withdraw the limits. The remote component 16 can be an electronic unit that can plug into the vehicle 12 or into the ECU 14 directly to operate the ECU 14, such as a diagnostic tool or another suitable electronic device. In some embodiments, the remote component 16 can communicate with the ECU 14 (or a selected component thereof) wirelessly using a controller area network ("CAN"), Wi-Fi, BLUETOOTH™ or another suitable wireless communication protocol. The remote component 16 can communicate with a registration component 18 to record information regarding the status of the vehicle 10 and of the ECU 14. In an example, the registration component 18 can be a server or another computing unit that can store registration information for the vehicle 12. The registration component 18 can store registration information such as purchaser name, address, financing, contact information, etc. The remote component 16 can be operated by a dealership where the vehicle 12 is sold. The ECU 14 can be programmed to permit the vehicle 12 to operate without limitations for an initial period, such as 5 engine hours, or 50 miles, or any other suitable initial period. This permits the dealer to demonstrate the vehicle 12 to customers without limitation. After the initial period, however, the ECU 14 will trigger the operation limits to encourage the dealer and/or purchaser to register the vehicle 12 with the registration component 18. In some embodiments, the ECU 14 can delay the limits until a current trip is over to avoid causing the vehicle to become stranded. For example, if the limiter is configured to prevent the vehicle 12 from operating at all, the ECU 14 can be programmed with a grace period so that if a purchaser is out on a test ride, the vehicle 12 will not simply shut down immediately. Rather, the vehicle 12 can display a warning that the time has passed, and that the vehicle 12 should now return to the dealership or be properly registered. After a certain time, however, the limitations can escalate to prevent a user from skirting the protections of the ECU 14 by simply running the vehicle 12 indefinitely.

The limiter 14*b* can institute a series of limits that can escalate in intensity as the engine time is progressively exceeded by greater and greater margins. For example, the limiter 14*b* may first issue a notification only, with no actual limit placed on the operation of the vehicle. Then, if the vehicle 12 is not registered and the ECU 14 is not properly deactivated, the limiter 14*b* can limit the RPMs slightly. If still more time passes without the ECU 14 being properly deactivated, the limiter 14*b* can more severely limit the vehicle 12.

Each vehicle 12 can have a unique identifier that can be sent to the registration component 18. In response, the registration component 18 can deliver an unlock code to the remote component 16. Once registration is complete, the unlocking code can be entered into the ECU 14 to remove the vehicle limitations. In some embodiment, the registration component 18 can be a web server that can be accessed through a standard web browser that can receive the vehicle identification credentials and can respond with an unlocking code for the ECU 14. A diagnostic tool can be used to remove the vehicle limitations. The system 10 therefore encourages proper registration of the vehicle 10 to prevent warranty fraud and theft.

Figure 2:
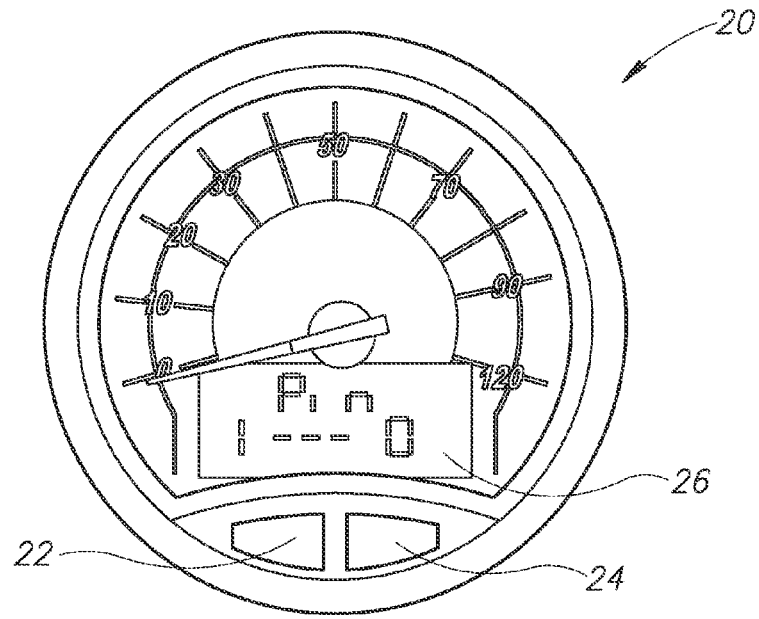
FIG. 2 is an illustration of a vehicle gauge and display screen of the electronic vehicle limiter according to the present invention.

FIG. 2 illustrates a keypad 20 on a gauge of a vehicle according to embodiments of the present disclosure. The keypad 20 can include a first button 22, a second button 24, and an electronic display 26. In some embodiments, the display 26 can show an error code when the limiter is engaged. The error code can be verbose and spell out in prose that the vehicle has a limiter that has been engaged because the vehicle has not been registered properly. Or, the display 26 can show a numeric code that is correlated with a message describing the limiter and the circumstances that is included with documentation such as an owner's manual. The buttons 22, 24 can be used to input the unlock code. Virtually any other type of input mechanism or user interface can be used to input the unlock code to the vehicle.

Figure 3:
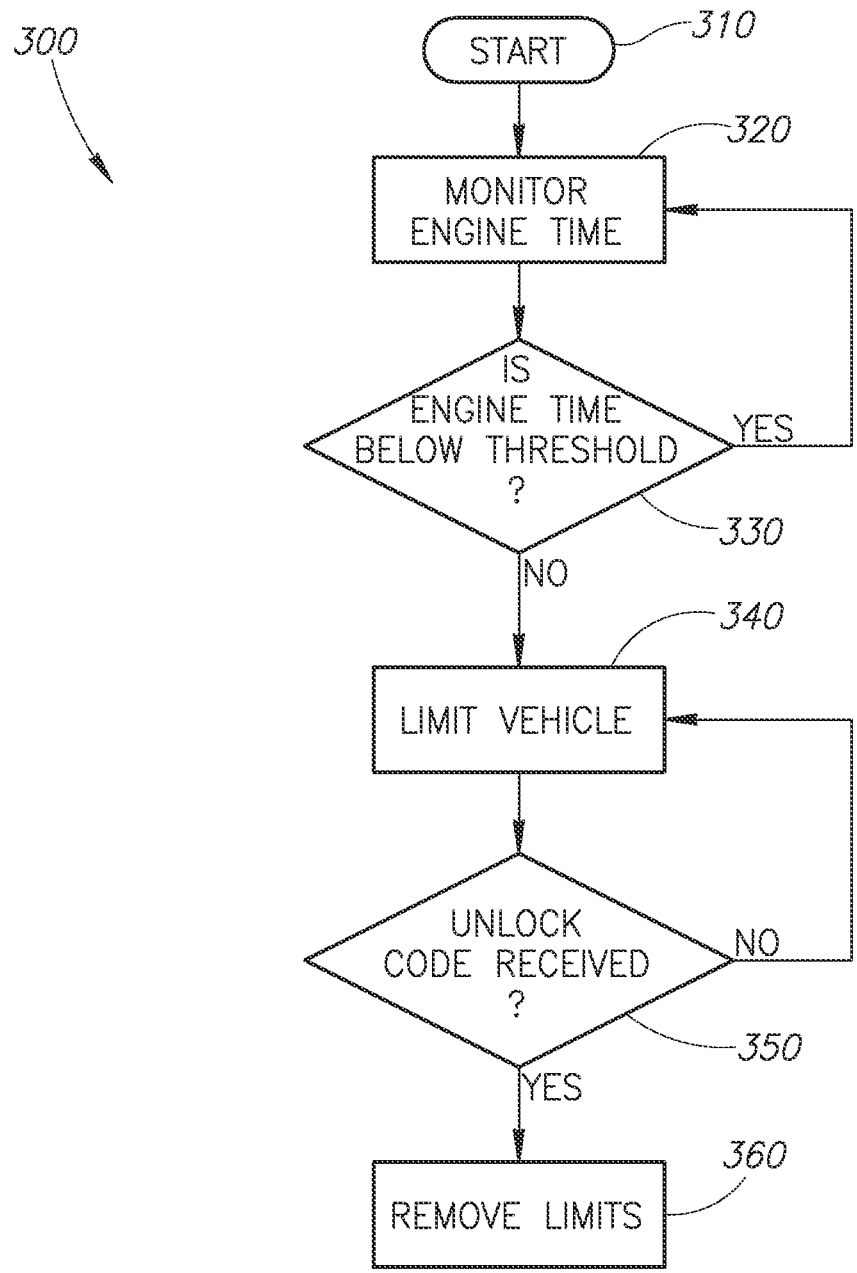
FIG. 3 is a flow diagram of a method of selectively limiting operation of a vehicle according to the present invention.

FIG. 3 is a flow chart of a method 300 of selectively limiting a vehicle according to embodiments of the present invention. The method begins at step 310, after which the method includes monitoring engine time 320. This can be achieved with a vehicle monitoring component 14*a* as described above. In other embodiments, this step can include monitoring any other suitable parameter including those listed elsewhere herein. At step 330, the method includes checking whether or not the engine time has exceeded a predetermined threshold. The threshold can be any arbitrary time period, such as 5 engine hours, 10 engine hours, etc. The threshold can be an absolute time threshold independent of engine status. The check in this step relates to the parameter monitored in step 320. In other embodiments in which the parameter monitored at step 320 is something other than engine time, the check at step 330 can check for that parameter. For example, if the parameter of step 320 is to monitor fuel consumption, then the check in step 330 can be whether or not the fuel consumption has exceeded a predetermined threshold limit.

If the check at step 330 is affirmative, control passes back to step 320 to continue monitoring. In other embodiments, the method can cease after this step if a one-time check is desired. If the check is negative, meaning that the engine time threshold has been exceeded, the method includes limiting the vehicle at step 340. The limit placed on the vehicle can be any suitable limit including those described elsewhere herein, such as a vehicle speed limit, engine operation limit, travel distance limit, fuel consumption limit, or any other suitable limit.

In some embodiments the method can include multiple checks similar to the check at step 330. Each check can have a corresponding threshold and a similarly corresponding limit to impose. These checks and limits can be executed independently, or in series. For example, two independent checks can be performed on fuel consumption and engine time. These parameters may be related, but are generally independent. The limit imposed by exceeding either of these thresholds can be the same limit, or can be separate independent limits. For example, the limit imposed by exceeding the engine time limit may be preventing the engine to run, and the limit imposed by exceeding the fuel consumption limit may be something different, such as a speed limit. The severity of the limit imposed can be increased as each threshold is exceeded. In some embodiments, for example, for each monitored parameter in which a prescribed threshold is exceeded, the speed of the vehicle can be limited to a greater degree, such as 60 mph for the first threshold, 50 mph for the second, 40 for the third, and so on.

The method can further include a periodic check of whether or not an unlock code has been received at step 350. If the unlock code has not been received, the limits continue at step 340. When the unlock code is received, the limits can be removed at step 360. There may be multiple unlock codes for each vehicle, each of which can unlock all or part of the limits placed on the vehicle.

While the preferred embodiments of the invention have been illustrated and described, as noted above, many changes can be made without departing from the spirit and scope of the invention. Accordingly, the scope of the invention is not limited by the disclosure of the preferred embodiments. Instead, the invention should be determined entirely by reference to the claims that follow.

The embodiments of the invention in which an exclusive property or privilege is claimed are defined as follows:

1. An electronic control unit ("ECU") system for a vehicle, comprising:
    a vehicle monitoring component configured to monitor engine usage of the vehicle, wherein the engine usage is cumulative and includes a current engine usage combined with prior engine usages; and
    a limiter operably coupled to the vehicle monitoring component and configured to permit uninhibited operation of the vehicle in a default state and place limits on operation of the vehicle when the vehicle monitoring component detects that the cumulative engine usage of the vehicle reaches a predetermined threshold, wherein the ECU is configured to receive an instruction to withdraw the limits;
    wherein the limiter is further configured to place the limits on operation of the vehicle that enable driving of the vehicle in an inhibited manner that includes a lesser range of operational limits than the uninhibited operation.

2. The ECU system of claim 1, wherein the vehicle has a unique identifier, the ECU system further comprising a registration component computer system configured to receive the unique identifier of the vehicle and to issue a code in response, wherein the code is required by the ECU system to withdraw the limits.

3. The ECU system of claim 1, wherein at least one of the vehicle monitoring component and the limiter are mounted within the vehicle.

4. The ECU system of claim 1, wherein the vehicle monitoring component is further configured to monitor vehicle parameters.

5. The ECU system of claim 4, wherein the vehicle parameters comprise at least one of engine time, revolutions per minute, fuel usage, speed, distance traveled, power output, exhaust, and electrical system performance.

6. The ECU system of claim 5, wherein the limiter is configured to limit operation of the vehicle in response to exceeding a predetermined threshold value for at least one of the parameters.

7. The ECU system of claim 1, further comprising a remote component configured to communicate with the vehicle monitoring component and to instruct the limiter to limit the operation of the vehicle or to withdraw operation limits from the vehicle.

8. The ECU system of claim 7, wherein the remote component is configured to be plugged into the vehicle to communicate with at least one of the vehicle monitoring component or the limiter.

9. The ECU system of claim 7, wherein the remote component is configured to communicate wirelessly with at least one of the vehicle monitoring component or the limiter.

10. The ECU system of claim 1, further comprising a keypad input within the vehicle configured to receive an unlock code operable to remove the limits.

11. The ECU system of claim 1, wherein the limiter is operably coupled to a fuel injection system of the vehicle and configured to limit at least one of the revolutions per minute of the vehicle or the speed of the vehicle by altering operation of the fuel injection system.

12. The ECU system of claim 1, wherein the limiter is configured to measure engine usage as engine operating time.

13. A method of controlling a vehicle, comprising:
    monitoring, by an electronic control unit housed within the vehicle, engine usage of a vehicle, wherein the engine usage is cumulative and includes a current engine usage combined with prior engine usages;
    permitting, by the electronic control unit, the vehicle to operate without limitation if the cumulative engine usage is below a predetermined threshold; and
    when the cumulative engine usage reaches the predetermined threshold, limiting, by the electronic control unit operation of the vehicle;
    withdrawing, by the electronic control unit, limits from the vehicle by inputting a vehicle identifier to a registration component computer system and receiving from the registration component computer system an unlock code that is operable to permit the vehicle to operate the vehicle without limits.

14. The method of claim 13, further comprising:
    after withdrawing the limits from the vehicle, instating a new engine usage threshold;
    monitoring the engine usage;
    permitting the vehicle to operate without limitation if the engine usage is below the new engine usage threshold; and
    when the engine usage reaches the new engine usage threshold, limiting operation of the vehicle.

15. The method of claim 13, further comprising submitting registration information from a purchaser of the vehicle before receiving from the registration component the unlock code.

16. The method of claim 13, further comprising inputting an unlock code operable to permit the vehicle to operate the vehicle without limits.

17. The method of claim 13 wherein limiting operation of the vehicle comprises at least one of preventing the engine from starting, limiting revolutions per minute of the engine, limiting top speed of the engine, limiting load on the engine, limiting terrain on which the vehicle is permitted to travel, limiting the distance the vehicle is permitted to travel, limiting the power output of the vehicle, and limiting the fuel consumed by the vehicle.

18. The method of claim 13, further comprising delaying limiting operation of the vehicle and permitting the vehicle to operate without limitation when the predetermined engine usage threshold is reached until the engine is stopped by a user.

19. The method of claim 13, further comprising monitoring at least one vehicle parameter in addition to engine usage.

20. The method of claim 19, wherein limiting operation of the vehicle comprises limiting operation of the vehicle in response to detecting that the vehicle parameter has exceeded a predetermined threshold.

21. The method of claim 19, wherein the vehicle parameter comprises a location of the vehicle, an identity of a driver of the vehicle, an identity of a passenger of the vehicle, a load on the vehicle, power output of the vehicle, fuel consumption of the vehicle, fuel type used, distance traveled, speed of the vehicle, or terrain type.

22. The method of claim 13, further comprising notifying a remote component that the cumulative engine usage has reached the predetermined threshold.

23. The method of claim 13, wherein monitoring engine usage comprises monitoring engine operating time.

24. An electronic control unit ("ECU") for a vehicle, comprising:
a vehicle monitoring component configured to monitor engine time of the vehicle, wherein the engine time is cumulative and includes a current engine time combined with prior engine times, and compare the cumulative engine time of the vehicle to a predetermined time;
a limiter coupled to an electronic fuel injection system of the vehicle, wherein the limiter is configured to impose a limit on at least one of revolutions per minute ("RPM") of the vehicle or a speed of the vehicle in response to the vehicle monitoring component detecting that the cumulative engine time has exceeded the predetermined time, an amount of the limit increasing with increasing of an amount of cumulative engine time in excess of the predetermined time; and
a code receiving component configured to receive a code that deactivates the limiter.

25. The ECU of claim 24, wherein the code receiving component comprises a keypad on the vehicle.

26. The ECU of claim 24, wherein the code receiving component comprises a remote unit that communicates electronically with the ECU to deliver the code to the ECU.

27. The ECU of claim 24, wherein the vehicle is a recreational off-road vehicle.

28. The ECU of claim 24, wherein the vehicle monitoring component is further configured to monitor one or more additional parameters of the vehicle in addition to engine time; and
wherein the limiter is further configured to impose the limit in response to any one of the cumulative engine time and the one or more additional parameters exceeding a corresponding threshold.

29. The ECU of claim 28, wherein the limiter is further configured to increase the limit with increase in a number of the cumulative engine time and one or more additional parameters that exceed one or more corresponding thresholds.

* * * * *